(12) United States Patent
Kazami et al.

(10) Patent No.: US 7,999,854 B2
(45) Date of Patent: Aug. 16, 2011

(54) DIGITAL CAMERA FOR OUTPUTTING IMAGE DATA ACCORDING TO APPLICATION PROGRAM, AND PERIPHERAL FOR CARRYING OUT APPLICATION PROGRAM

(75) Inventors: Kazuyuki Kazami, Tokyo (JP); Akira Ohmura, Tokyo (JP); Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 1362 days.

(21) Appl. No.: 10/879,180

(22) Filed: Jun. 30, 2004

(65) Prior Publication Data
US 2004/0239766 A1 Dec. 2, 2004

Related U.S. Application Data

(63) Continuation of application No. 10/456,782, filed on Jun. 9, 2003, now abandoned.

(30) Foreign Application Priority Data

Jun. 28, 2002 (JP) ................................. 2002-188834

(51) Int. Cl.
*H04N 5/225* (2006.01)
(52) U.S. Cl. ................................. 348/207.99; 348/207.1
(58) Field of Classification Search ............ 348/207.11, 348/207.2
See application file for complete search history.

(56) References Cited

U.S. PATENT DOCUMENTS

| 5,402,170 | A | * | 3/1995 | Parulski et al. ............ 348/211.6 |
| 6,120,379 | A | * | 9/2000 | Tanaka et al. ................... 463/44 |
| 6,540,610 | B2 | * | 4/2003 | Chatani .......................... 463/31 |
| 6,552,743 | B1 | | 4/2003 | Rissman ................... 348/207.2 |
| 6,567,845 | B1 | * | 5/2003 | Chatani .......................... 463/43 |
| 6,603,506 | B2 | | 8/2003 | Ogawa et al. ............. 348/207.2 |
| 6,811,492 | B1 | * | 11/2004 | Arakawa et al. ................ 463/43 |
| 2002/0061781 | A1 | | 5/2002 | Tonomura |
| 2002/0065135 | A1 | | 5/2002 | Chatani .......................... 463/40 |
| 2002/0140952 | A1 | | 10/2002 | Fukasawa ...................... 358/1.6 |
| 2002/0196346 | A1 | | 12/2002 | Nishio et al. .............. 348/207.2 |
| 2003/0227554 | A1 | * | 12/2003 | Kazami et al. ............. 348/231.3 |

FOREIGN PATENT DOCUMENTS

| EP | 1 130 506 A2 | 9/2001 |
| JP | 10-065867 | 3/1998 |
| JP | A 2001-087559 | 4/2001 |
| JP | A 2001-203996 | 7/2001 |
| JP | A-2001-274936 | 10/2001 |
| JP | 2002-153670 | 5/2002 |

* cited by examiner

*Primary Examiner* — Luong T Nguyen
(74) *Attorney, Agent, or Firm* — Oliff & Berridge, PLC

(57) ABSTRACT

The object of the present invention is to provide a digital camera system capable of transmitting image information suitable for the purpose of image usage in a peripheral. Special information in connection with an application program used in the peripheral is output to a digital camera, an image data processed in the digital camera on the basis of the special information is output to the peripheral, and the peripheral executes the application program by inputting the processed image data into the application program. The special information is the size of a character, the number of colors, resolution, and the like used in the application program.

5 Claims, 18 Drawing Sheets

REMAINING FRAMES; 100(105) FRAMES

FIG. 11

APPLETE PROGRAMS AND PROCESSED DATA TO BEDELETED ARE SO FAR SHOWN BELOW.

CHECK THE DATA TO BE DELETED.

| | DATA NAME | RECORDING DATE | CAPACITY |
|---|---|---|---|
| [V] | PRINTER MADE BY A CO., TYPE XYZ, VER. 3.0 | 2002/02/10 | 10KB |
| | PROCESSED IMAGE DATA | | 300KB |
| [V] | DISPLAY MADE BY B CO., TYPE ABC | 2002/03/06 | 20KB |
| [V] | PRINTER MADE BY A CO., TYPE DEF, VER. 1.0 | 2002/05/15 | 5KB |
| | PROCESSED IMAGE DATA | | 850KB |
| [ ] | PRINTER MADE BY C CO., TYPE GHI, VER. 1.5 | 2002/05/16 | 100KB |

FINISHED SELECTING ?    YES    NO

FIG. 13

SELECT PROCESSING METHOD.

[V] READ OUT A PROCESSING PROGRAM FROM THE CONNECTED DEVICE.

[ ] CARRY OUT PROCESSING BY A DEFAULT PROGRAM.

[ ] CARRY OUT PROCESSING BY SELECTING ANOTHER PROGRAM.

[ ] PRINTER MADE BY A CO., TYPE XYZ, VER. 3.0     2002/02/10     10KB
    [ ] DISPLAY MADE BY B CO., TYPE ABC     2002/03/06     20KB
    [ ] PRINTER MADE BY A CO., TYPE DEF, VER. 1.0     2002/05/15     5KB
    [ ] PRINTER MADE BY C CO., TYPE GHI, VER. 1.5     2002/05/16     100KB

FINISHED SELECTING ?     YES     NO

FIG. 15

DIGITAL CAMERA FOR OUTPUTTING IMAGE DATA ACCORDING TO APPLICATION PROGRAM, AND PERIPHERAL FOR CARRYING OUT APPLICATION PROGRAM

This is a Continuation of application Ser. No. 10/456,782 filed Jun. 9, 2003. The entire disclosure of the prior application is hereby incorporated by reference herein in its entirety.

INCORPORATION BY REFERENCE

The disclosures of the following priority application is herein incorporated by reference: Japanese Patent Application No. 2002-188834 filed Jun. 28, 2002.

BACKGROUND OF THE INVENTION

1. Field of the Invention

The present invention relates to a digital camera system capable of mutually transmitting a data between a digital camera and a peripheral.

2. Description of Related Art

It has been requested that a user wants to use an image shot by a digital camera as a character of a game or a waiting frame of a cellular phone. A game machine and a cellular phone capable of inputting an image data actually shot by a digital camera as a character have been known. Thereby it can be prevented that a user gets tired of seeing even if the game is usually repeated several times. In a cellular phone also, it becomes possible to change freely a waiting frame in accordance with a user's taste. The LCD display of the cellular phone has the size of about 2 inches, the number of pixels of about several ten thousands pixels, and the number of display color of about several ten thousands colors, which are fewer pixels and colors relative to those of the digital camera. Practically, it has been known that a digital camera that outputs an image data of, for example, 320 by 240 pixels as a waiting frame.

The above-described number of pixels of the image for the waiting frame output from the digital camera is predetermined by the digital camera and cannot be selected in accordance with each cellular phone. It is needless to say that the number of output pixels cannot be selected in response to each kind of game. It may happen such wasteful case that an image data several hundreds times larger than that to be required is transmitted.

SUMMARY OF THE INVENTION

The present invention is made in view of the aforementioned problems and has an object to provide a digital camera system, comprising a digital camera and a peripheral connected to the digital camera, capable of transmitting information necessary for a program used by the peripheral.

According to one aspect of the present invention, a digital camera system includes a digital camera and a peripheral. The digital camera includes a special information input section that inputs special information from the peripheral, an image data memory that stores an image data, and an image data output section that outputs the image data processed on the basis of the special information to the peripheral. The peripheral includes an application program memory that stores at least one application program, a special information memory that stores the special information in connection with the aforesaid at least one application program stored in the application program memory, a special information output section that outputs the special information to the digital camera, an image data input section that inputs the processed image data from the digital camera, a memory that stores the processed image data, and an executing means that executes the application program by inputting the processed image data stored in the memory into the application program. Accordingly, in an application program for using a game machine and a personal computer, character information used in the game machine is transmitted from the game machine to the digital camera. Receiving the information, the digital camera forms an image data processed in accordance with the character information to return to the game machine. Therefore, user can enjoy games by using a new character.

In one preferred embodiment, the peripheral is defined to any one of a cellular phone, a personal computer, a game machine, and a videophone. The application program is defined to either one of a game program and a waiting frame used for the peripheral. The special information is at least one of an image size, the number of colors, resolution, a shooting direction of a character, a background size in the frame, and a scope of the background in the frame used in the application program. Accordingly, a large amount of shot image data is converted into a data amount suitable for a character used in the application program. Moreover, designated object image such as an upper half of the body, an entire body, a forward-looking, or a side view can be chosen.

According to another aspect of the present invention, a peripheral includes an application program memory that stores at least one application program, a special information memory that stores special information in connection with the aforesaid at least one application program stored in the application program memory, a special information output section that outputs the special information to a digital camera, an image data input section that inputs an image data from the digital camera, a memory that stores the image data, and an executing means that executes the application program by inputting the image data stored in the memory into the application program. By inputting an image data suitable for the application program to be used from the digital camera, a peripheral with which user can always enjoy games with a refreshing surprise.

In one preferred embodiment, when the peripheral starts the application program while connecting to the digital camera, the peripheral outputs the special information from the special information output section of the peripheral to an information input section of the digital camera. Accordingly, when a digital camera and a peripheral are connected and an application program is stared, special information is output from the peripheral to the digital camera, so that a change in a character is carried out quickly. In one preferred embodiment, when the peripheral connects to the digital camera while starting the application program, the peripheral outputs the special information from the special information output section of the peripheral to an information input section of the digital camera. Accordingly, when the connection is carried out after starting the application program, the special information is immediately output from the peripheral to the digital camera, so that a change in a character is carried out quickly.

Other feature and advantages according to the present invention will be readily understood from the detailed description of the preferred embodiment in conjunction with the accompanying drawings.

BRIEF DESCRIPTION OF THE DRAWINGS

FIG. 11 shows an example of a display of the number of remaining frames.

FIG. 13 shows an example of a display upon deleting an applet program.

FIG. 15 shows an example of a display upon selecting an applet program.

DESCRIPTION OF THE PREFERRED EMBODIMENTS

Example 1

Figure 1:
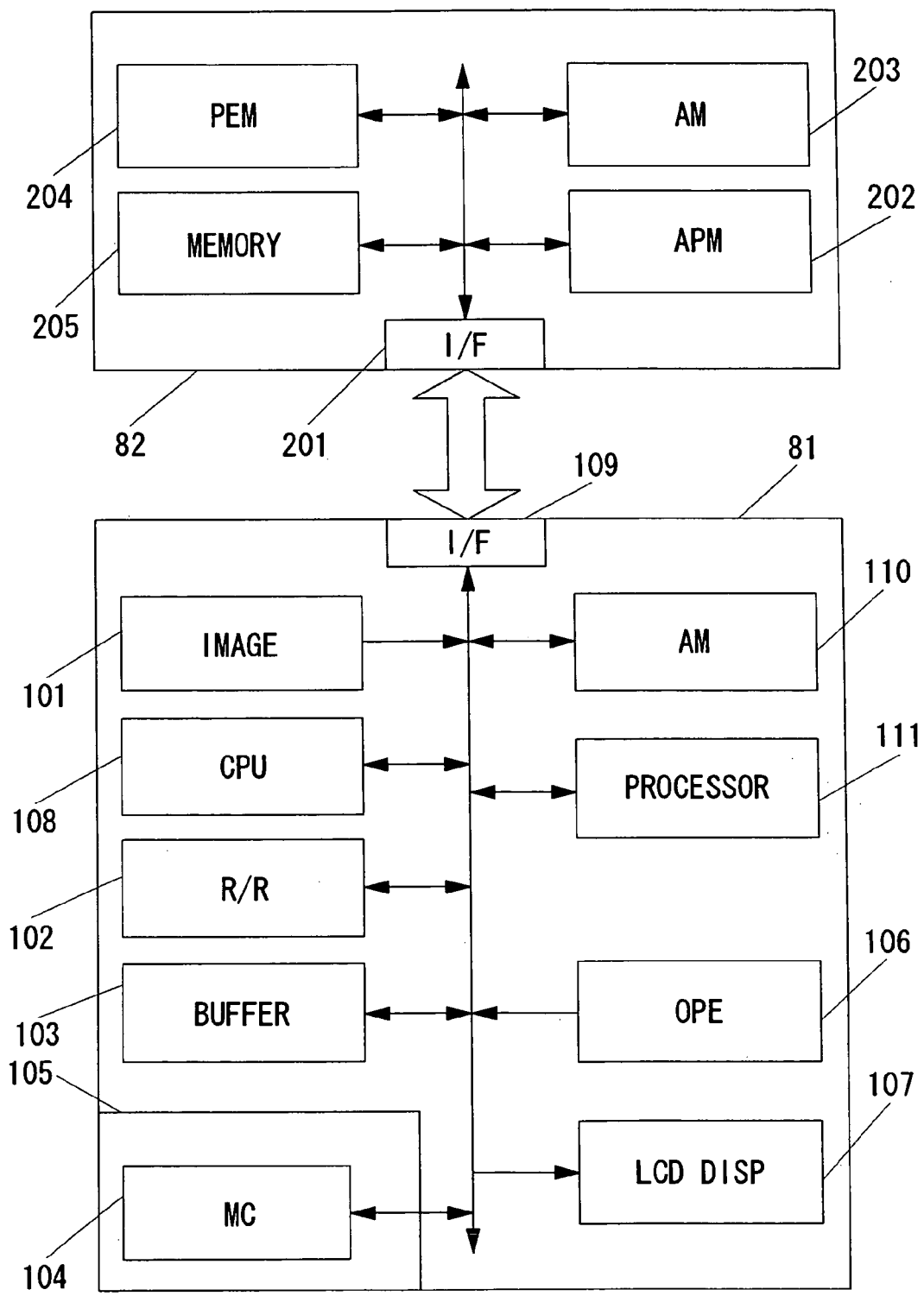
FIG. 1 is a block diagram showing a digital camera system according to Example 1 of the present invention.

FIG. 1 is a block diagram showing a digital camera system according to Example 1 of the present invention.

A digital camera 81 is equipped with the functions described below as a usual recording and playback function. There are an imaging section 101 for shooting an object, and a recorder/reproducer 102 for converting an image data into a digital data and carrying out recording/reproducing processing. In the recorder/reproducer 102, processing required for ordinary recording/reproducing such as gamma correction, white balance adjustment, compression/expansion, and the like is carried out. A buffer memory 103 for temporarily storing the image data while processing the signal, a memory card 104 composed of a flush memory and the like, a memory medium slot 105, operating section 106 for carrying out various settings such as setting a shooting condition, selecting image to be reproduced in accordance with the menu display, LCD display 107 for displaying a shot image and a reproduced image, and a CPU 108 for controlling these procedures are there in the digital camera 81. Each function explained above is indispensable for constructing an ordinary digital camera and other functions indispensable for constructing a digital camera are still there. However, needless functions to explain the present invention are abbreviated. So indispensable functions to explain the present invention are explained. The digital camera 81 has an interface 109 for mutually communicating data with a peripheral 82 such as a cellular phone and a game machine, an applet memory 110 for storing special information regarding an application program used in the peripheral 82, and a processor 111 for carrying out given processing on the basis of the special information. The above-described functions, 109 through 111, are also controlled by the CPU 108.

The peripheral 82 communicating data by connecting with the digital camera 81 has an interface 201, an application program memory 202 for storing various application programs such as a game software program, an applet memory 203 for storing special information regarding application programs, a program executing means 204 for carrying out an application program, and a memory 205 for storing an image data that is input from the digital camera 81 and used by the application program. Here, the special information is an applet program that transfers information such as the size, the number of colors, resolution, and shooting direction of a character, a background size in the frame, a scope of the background in the frame, and the like used by the application program to the digital camera and processes the image data on the basis of these information. The application program is, for example, a game software program and the like used by a waiting frame of a cellular phone or a videophone, a game machine, and a personal computer. In peripherals, functions and operating sections irrelevant to the present invention are abbreviated.

Figure 2:
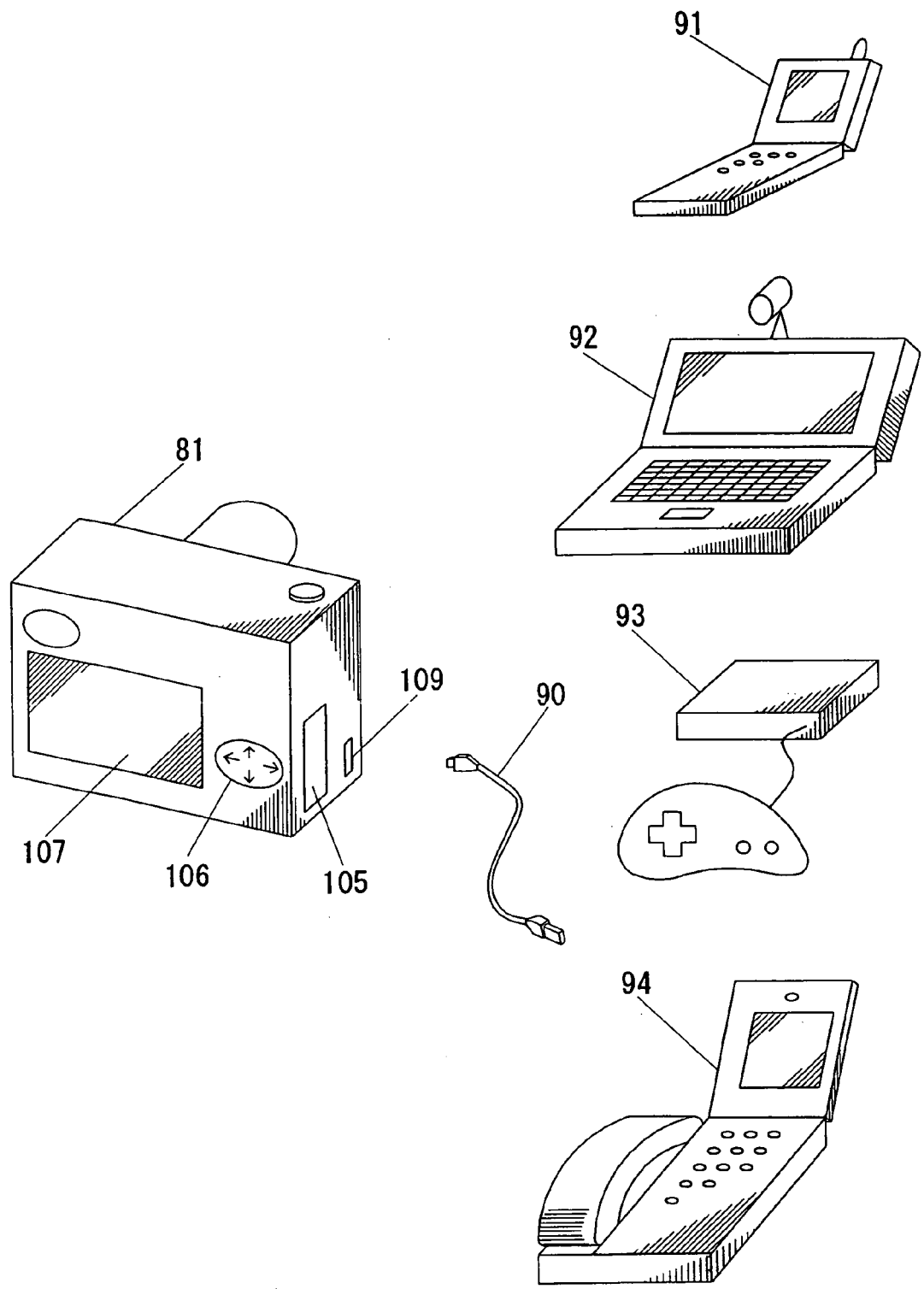
FIG. 2 is a drawing showing a digital camera and typical peripherals connecting to the same.

FIG. 2 is a drawing showing a digital camera 81 and typical peripherals connecting to the same. In FIG. 2, a digital camera 81 composed of a memory medium slot 105, an operating section 106, an LCD display 107, an interface 109, and the like is connected to a cellular phone 91, a personal computer 92, a game machine 93, a videophone 94, and the like through a cable 90. An image data to be used by the application program on each peripheral is transferred from the digital camera. In FIG. 2, although an example of connection through the cable 90 using USB (Universal Serial Bus) is shown, other wireless connection such as IrDA (Infrared Data Association) may be employed.

Figure 3:
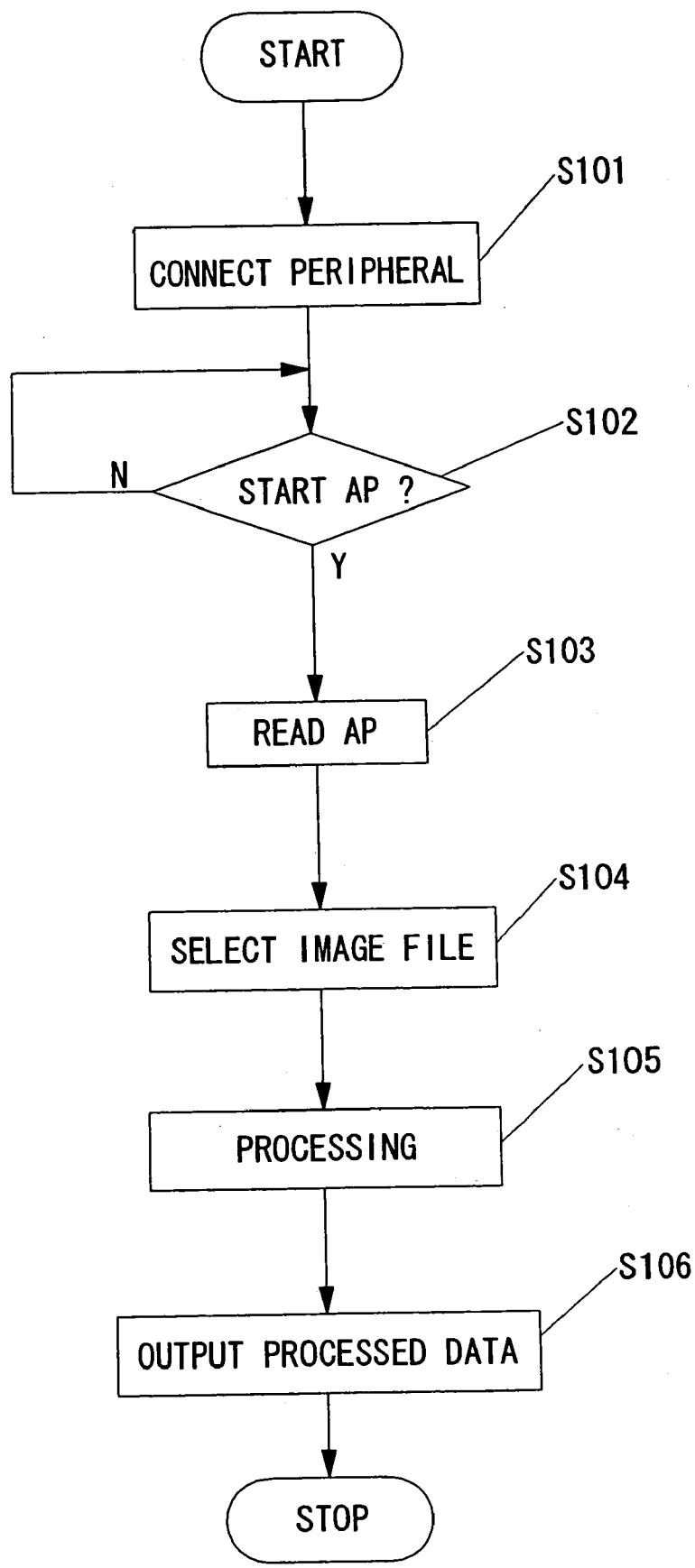
FIG. 3 is a flow chart explaining procedure of the digital camera according to Example 1 of the present invention.

FIG. 3 is a flow chart showing procedure of the digital camera shown by the block diagram of FIG. 1. In step S101, the digital camera 81 detects whether a peripheral 82 is connected or not. In step S102, whether or not an application program starts on the peripheral 82 is checked. When the application program does not start yet, the flow stay in step S102 until the application program starts. When the application program starts, the flow proceeds to step S103. In step S103, the applet program regarding the application program is read out from the peripheral 82. In step S104, an image file for outputting to the peripheral 82 is selected. Here, a shooting direction, the upper half or the whole body of a character is selected on the basis of the applet program, or an object is shot by the imaging section 101 in accordance with the instruction of the applet program. In step S105, the digital camera 81 carries out processing to the selected image file to become given pixels, resolution, and the number of colors. In step S106, the processed image is output to the peripheral 82 through the interface 109.

Figure 4:
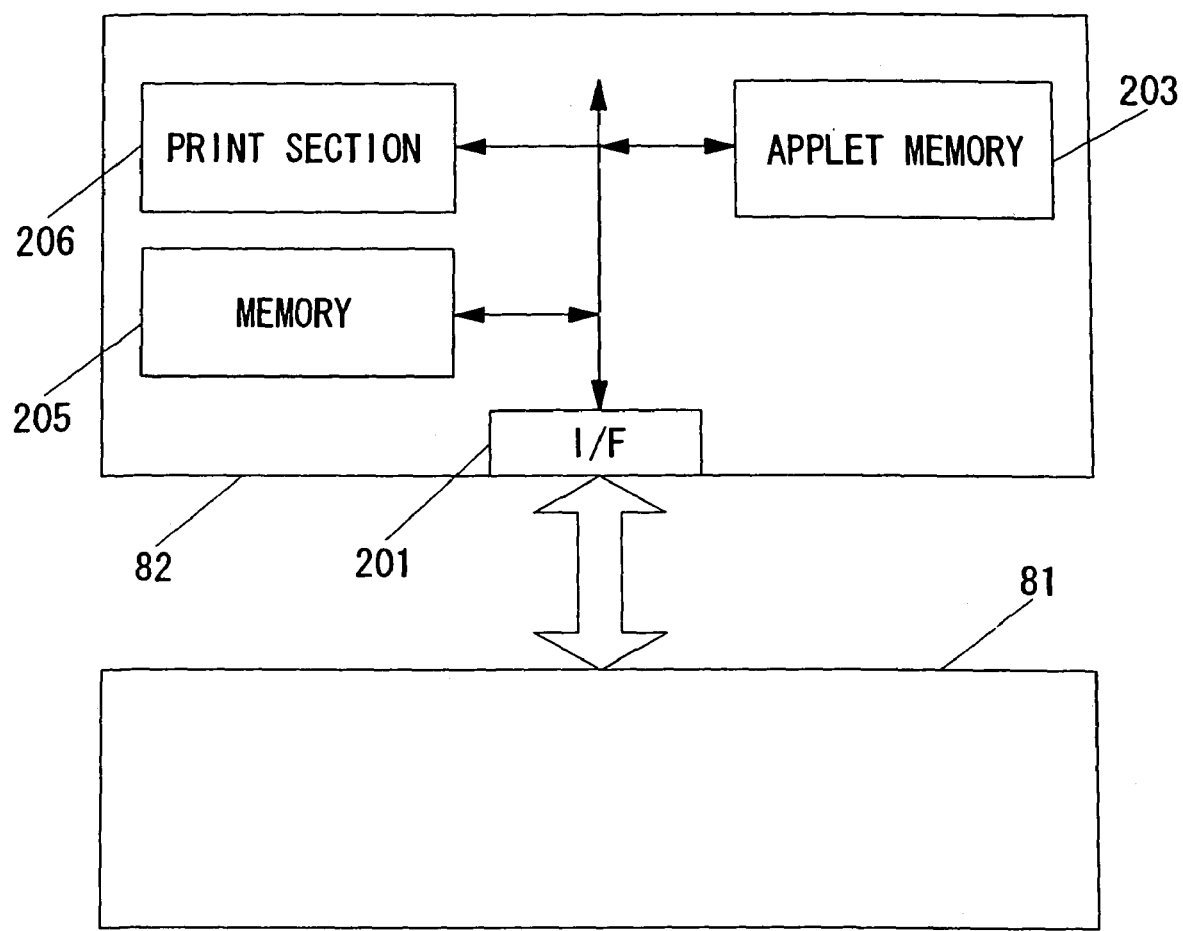
FIG. 4 is a block diagram showing a digital camera system when the connected peripheral is a printer.
Figure 5:
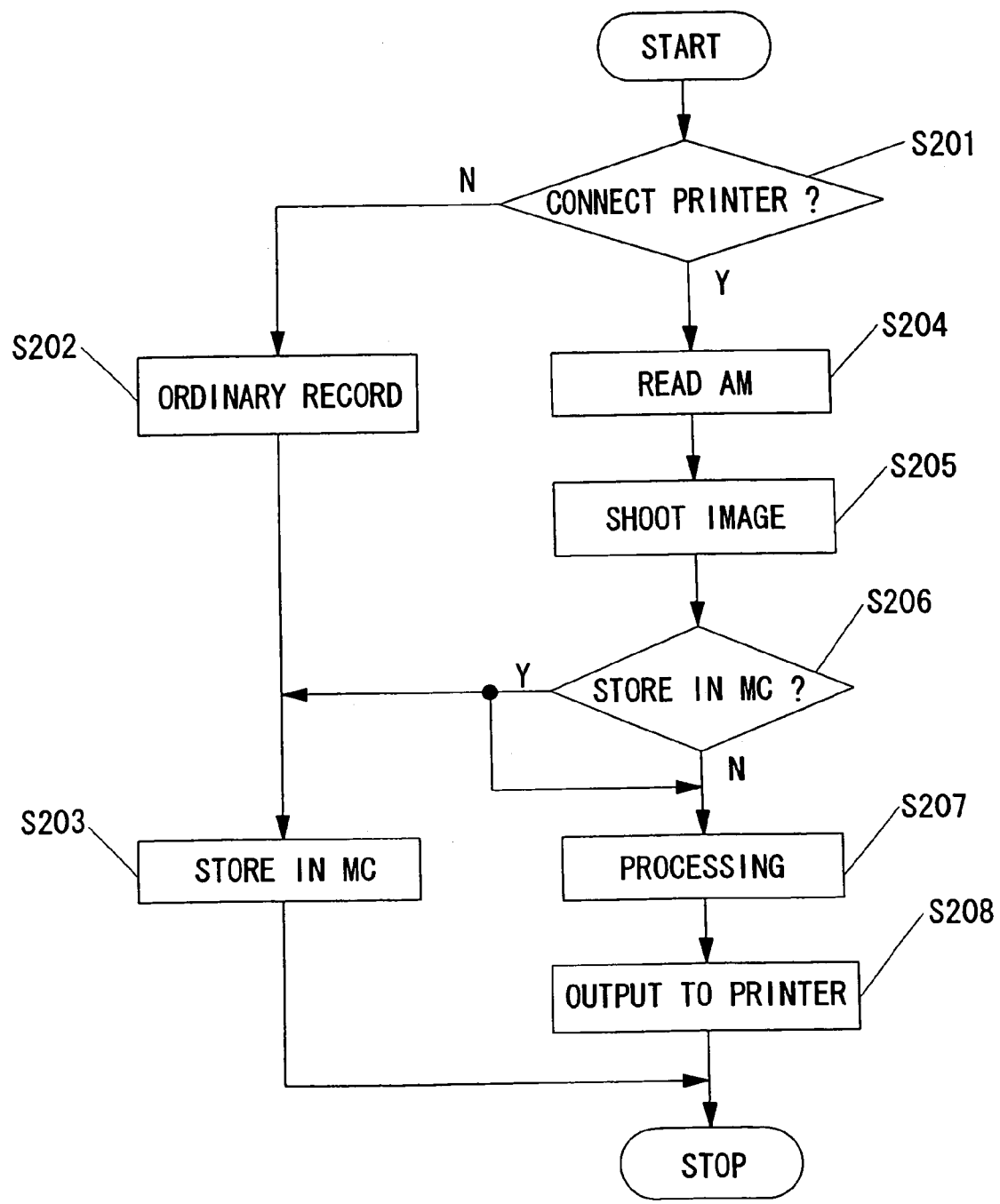
FIG. 5 is a flowchart showing a procedure of the digital camera system when the connected peripheral is a printer.

In FIG. 4, the case when a printer 82 is further connected as a peripheral in FIG. 2 is shown. The peripheral 82 has a print section 206 for printing an image data. Here, a program for carrying out printing and outputting a print corresponds to the aforementioned application program. The applet memory includes color-matching information for correcting print characteristics of the print section 206 and the maximum resolution information. The movement of the peripheral 82 shown in FIG. 4 is explained with reference to the flow chart shown in FIG. 5. In step S201 shown in FIG. 5, whether a printer as the peripheral 82 is connected to the digital camera 81 is checked. When the printer is not connected, the flow proceeds to step S202. In step S202, ordinary recording processing is carried out to the shot image. In other words, an image of an object is shot by the imaging section 101, carried out ordinary gamma correction and white balance adjustment, and compressed if necessary. In step S203, the image data is stored in the memory card 104.

In step S201, when the printer is connected to the digital camera, the flow proceeds to step S204. In step S204, an applet program that is special information is read out from the printer. In step S205, an object is shot with a given direction and size on the basis of the readout applet program. In step S206, whether the shot image is to be stored in the memory card or not is checked. When the image is set by the operating section 106 not to be stored in the memory card, the flow proceeds to step S207. In step S207, the image data is carried out color-matching processing, and the like on the basis of the applet program read out in step S204. In step S208, the processed image data is output to the printer. On the other hand, in step S206, when the image is set by the operating section 106 to be stored in the memory card, color-matching processing, and the like are carried out in step S207 and at the same time, is step S203, the shot image data processed with ordinary recording processing is stored in the memory card. At that time, when the memory card has been full, the new image data overwrites the old one in order from oldness.

In view of leaving a shot image data, it is desirable to set to be stored in the memory card. However, in the case of a business use that a camera and a printer is set in the street and the general public are shot and printed in large quantities, you do not have to leave the image data one by one. In that case, it is preferable to set not to be stored in the memory card.

Figure 6:
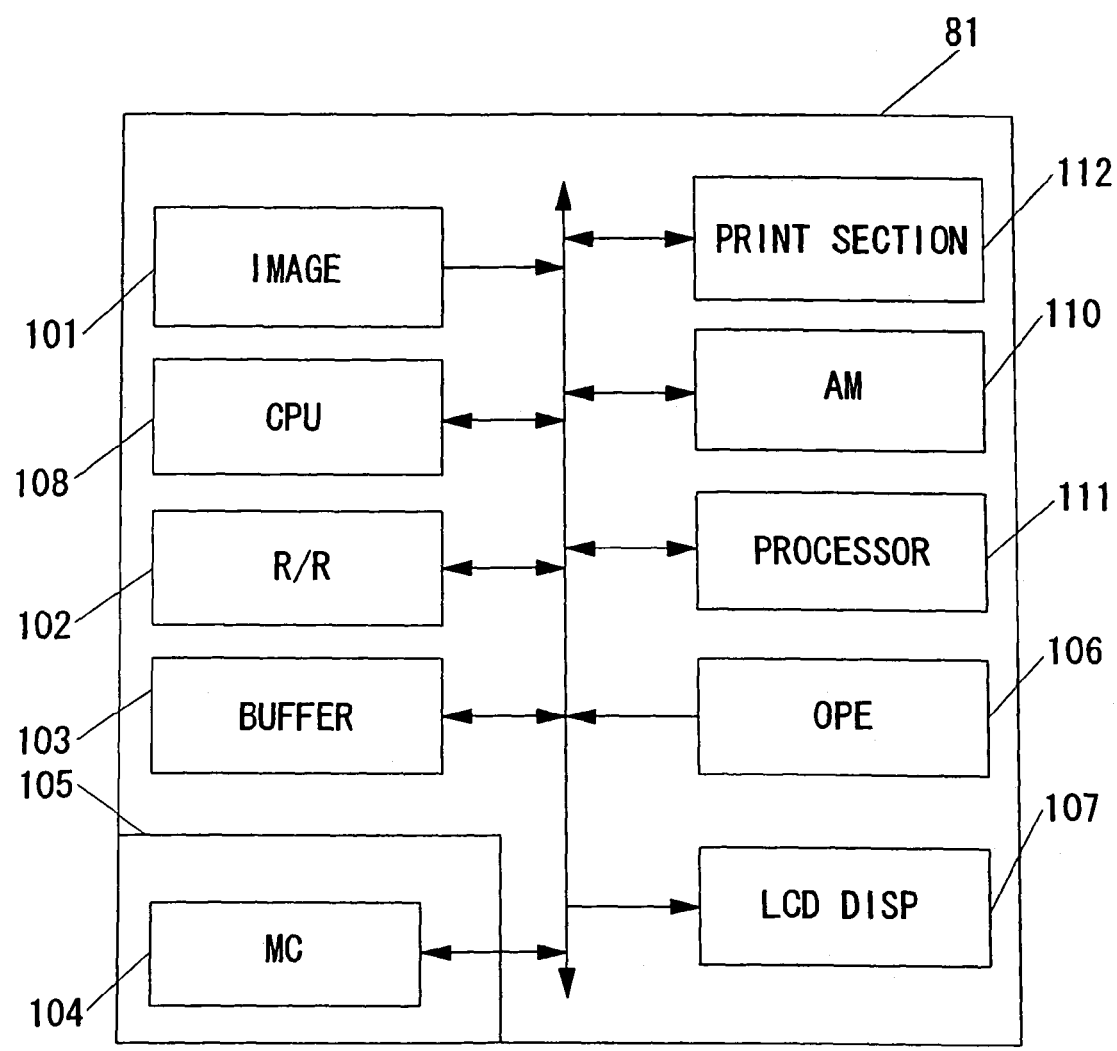
FIG. 6 is a block diagram showing a case that the digital camera and the printer shown in FIG. 4 are combined together.
Figure 10:
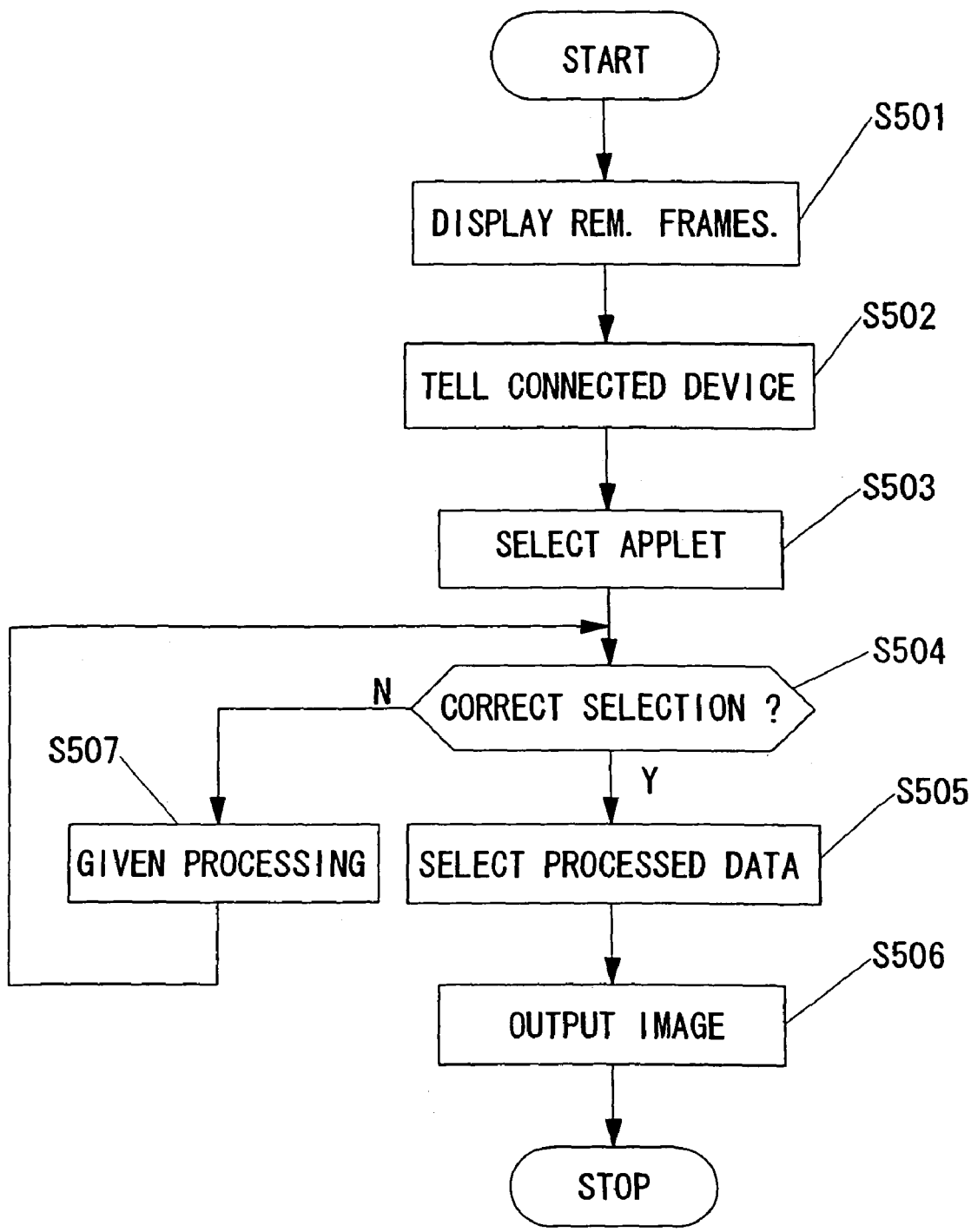
FIG. 10 is a flowchart showing movements of the digital camera shown in FIG. 7.

FIG. 6 is a block diagram showing a case that the digital camera and the printer shown in FIG. 4 are combined together. In this case, either one of the applet memories 110 and 203 shown in FIGS. 10 and 13 is enough. The interfaces 109 and 201 can be replaced by a suitable domestic communication means. This is not limited to a digital camera integrated with a printer, but it is similar to the construction that a digital camera and a peripheral is combined in a body such as a game machine or a personal computer equipped with an image acquiring section.

Example 2

Figure 7:
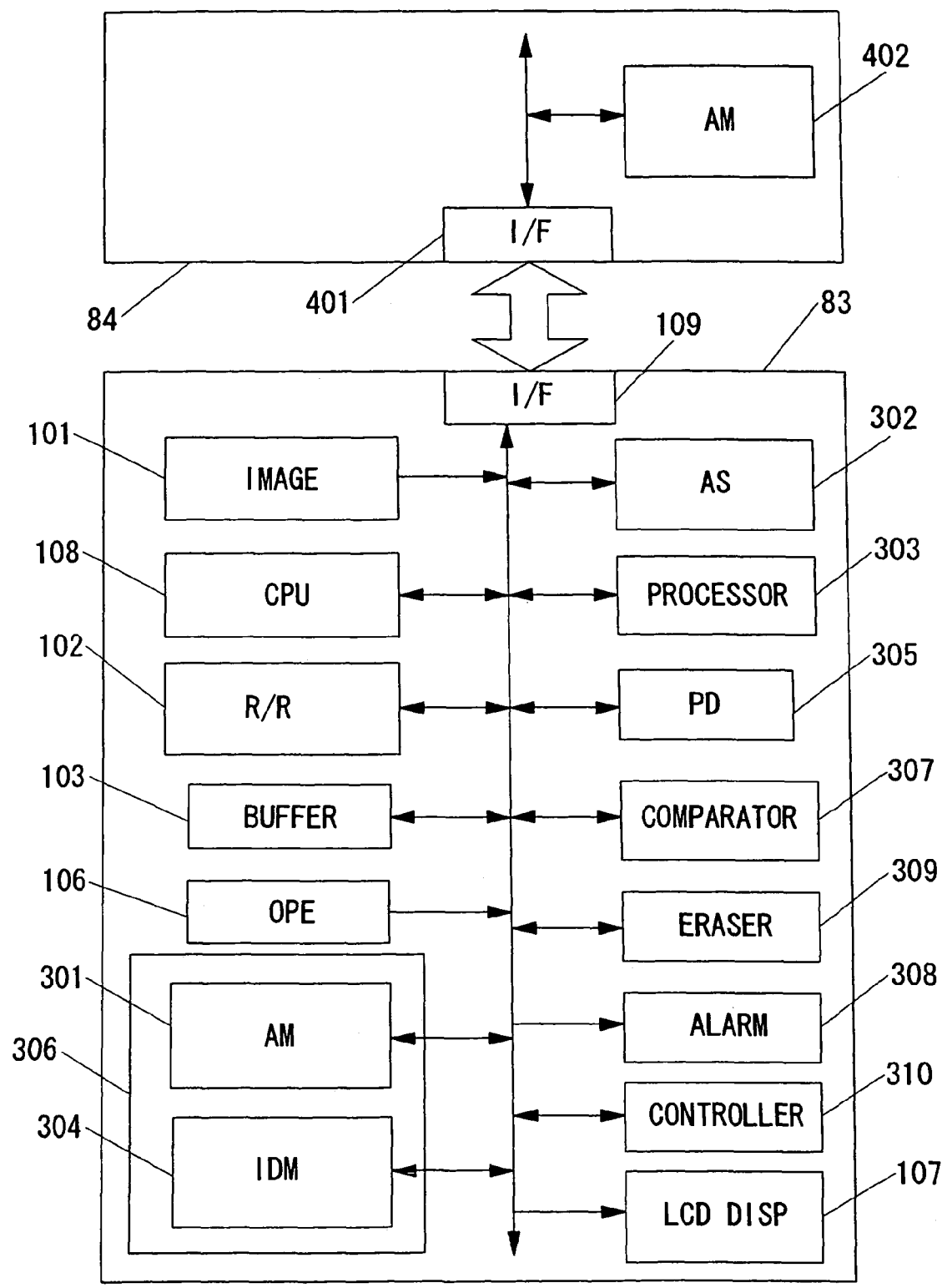
FIG. 7 is a block diagram showing a digital camera system according to Example 2 of the present invention.

FIG. 7 is a block diagram showing a digital camera system according to Example 2 of the present invention. In FIG. 7, a digital camera 83 has an imaging section 101, a recorder/reproducer 102, a buffer memory 103, an operating section 106, a display 107, a CPU 108, and an interface 109. Moreover, an applet program including special information corresponding with a plurality of kinds of peripherals 84 capable of connecting to the digital camera 83 is stored in an applet memory 301. Here, the peripheral denotes a printer, a monitor, and a cellular phone including the case that the type is different among the same kind of device.

The special information is an applet program that sends to the digital camera information on which the image data is processed; the information includes the number of pixels, maximum resolution, the number of colors, color-matching information, the maximum resolution of the printer, gamma characteristic of the display, and the like for displaying and printing on each peripheral. An operating section 106 is used for selecting an image from an image data memory 304 and a required applet program from the applet memory 301. The applet program is also selected by an applet selector 302 from the applet memory 301 on the basis of the discriminated result of a peripheral discriminator 305.

A processor 303 carries out given processing to the selected image on the basis of the selected applet program. The processed image data is stored in the image data memory 304. At this time, the processed image is controlled by a controller 310 in connection with the selected image. When a peripheral is connected to the digital camera, the peripheral discriminator 305 discriminates the maker name, the product name, and the serial number of the peripheral and discriminates the applet name corresponding to the peripheral. On the basis of the discriminated result, the applet selector 302 selects a corresponding applet program from the applet memory 301.

When the corresponding applet program is not stored or an ancient applet program is stored in the applet memory, a new applet program is obtained from the peripheral and stored in the applet memory 301. When a plurality of peripherals are connected to the digital camera at a time, the most suitable processed image data is output to each peripheral on the basis of the discriminated result of the peripheral discriminator 305.

The applet memory 301 and the image data memory 304 are located common in a data memory area 306. The special information and the image data are designated respective recording areas by the CPU 108. The common data memory area denotes, for example, image and sound data recording area in a memory card. The image data processed with ordinary recording processing by the recorder/reproducer 102 and that processed by the processor 303 on the basis of the special information are stored together in the image data memory 304. The remaining capacity of the common recording area is displayed on the LCD display 107 as a display.

The applet program name discriminated by the peripheral discriminator 305 and the applet program selected by the applet selector 302 are compared by a comparator 307 whether the two are coincide with each other. When they do not coincide with each other, an alarm 308 warns with a sound for warning. An eraser 309 deletes unnecessary data in the data memory area 306. A peripheral 84 has an interface 401 and an applet memory 402 for storing applet programs including special information regarding the peripheral.

FIGS. 8 through 14 are flowcharts showing movements and an example of the display of the digital camera shown in FIG. 7. In step S401 shown in FIG. 8, applet program names stored in the applet memory 301 of the memory card are displayed on the LCD display 107 by operating the operating section 106, and an applet program is selected from them. In step S402, image data stored in the image data memory 304 of the memory card is similarly read out, displayed on the LCD display 107, and selected an image to be output from the digital camera 83. In step S403, given processing is carried out on the basis of the applet program so as to correspond to the output peripheral.

In step S404, the selected image is connected with the processed image by the controller 310 in accordance with the instruction of the CPU 108 as described above. In step S405, the processed image data is stored in the buffer memory 103 or the image data memory 304 of the memory card. When the image data is to be output to a plurality of peripherals at a time, a plurality of applet programs corresponding to the peripherals are selected, and a plurality of images processed by the applet programs are stored in the image data memory 304 and, at the same time, the selected images are connected with the processed images corresponding to the peripherals.

The connected, processed image data is stored the buffer memory 103 or the image data memory 304 of the memory card by the CPU 108. In step S406, whether all image data to be processed has been processed or not is judged. When the processing has not completed yet, the flow goes back to step S401 and the above-described processes are repeated. When a plurality of applet programs are selected, the processes are repeated similarly. In this manner, a plurality of image data processed with a plurality of applet programs are stored in the digital camera 83 after carrying out a given connection. The timing of the connection is not limited to the example described above; the connection and the disconnection to the processed image can be easily carried out by the controller 310 at any time.

Figure 8:
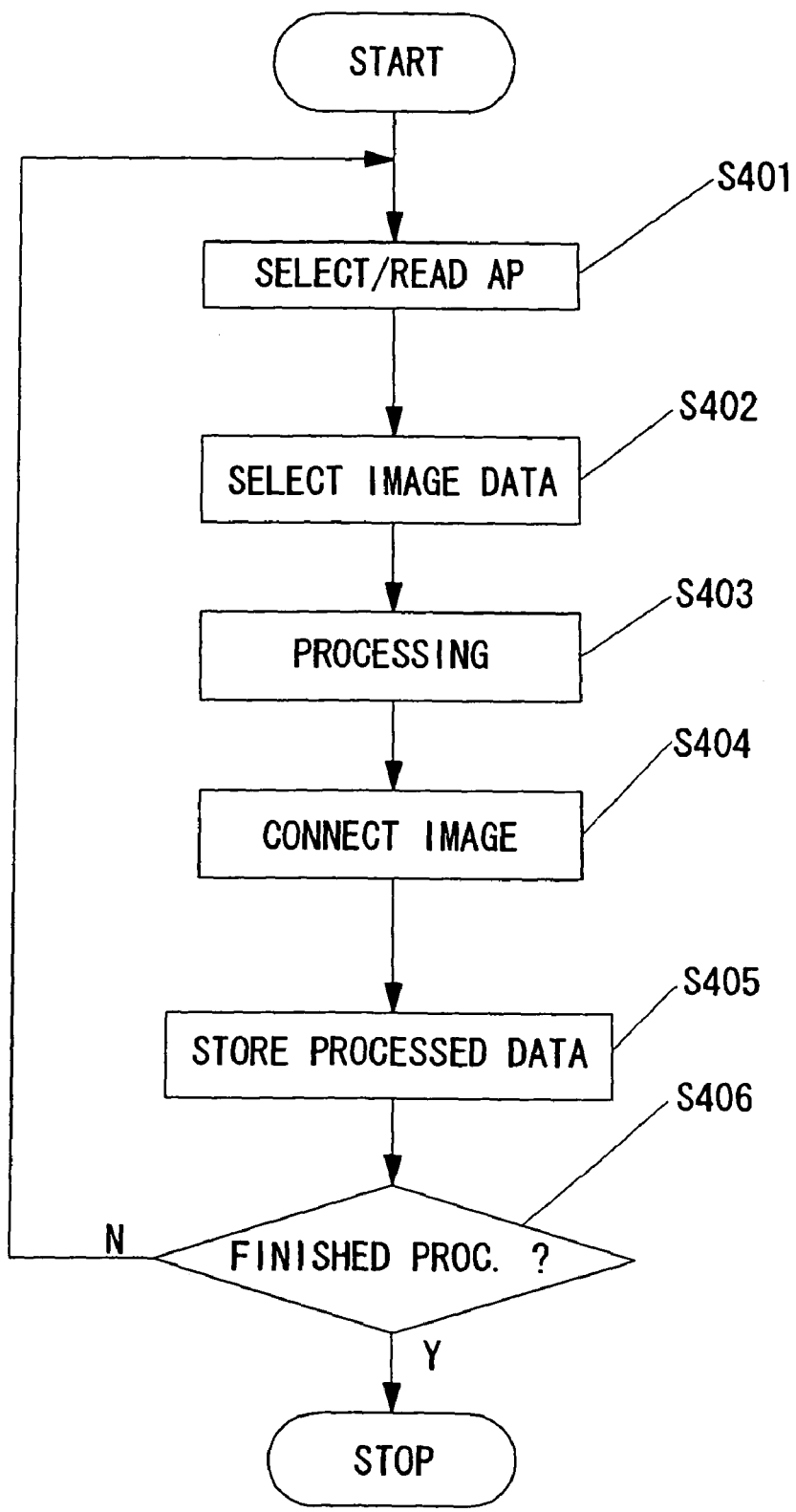
FIG. 8 is a flowchart showing movements of the digital camera shown in FIG. 7.
Figure 9:
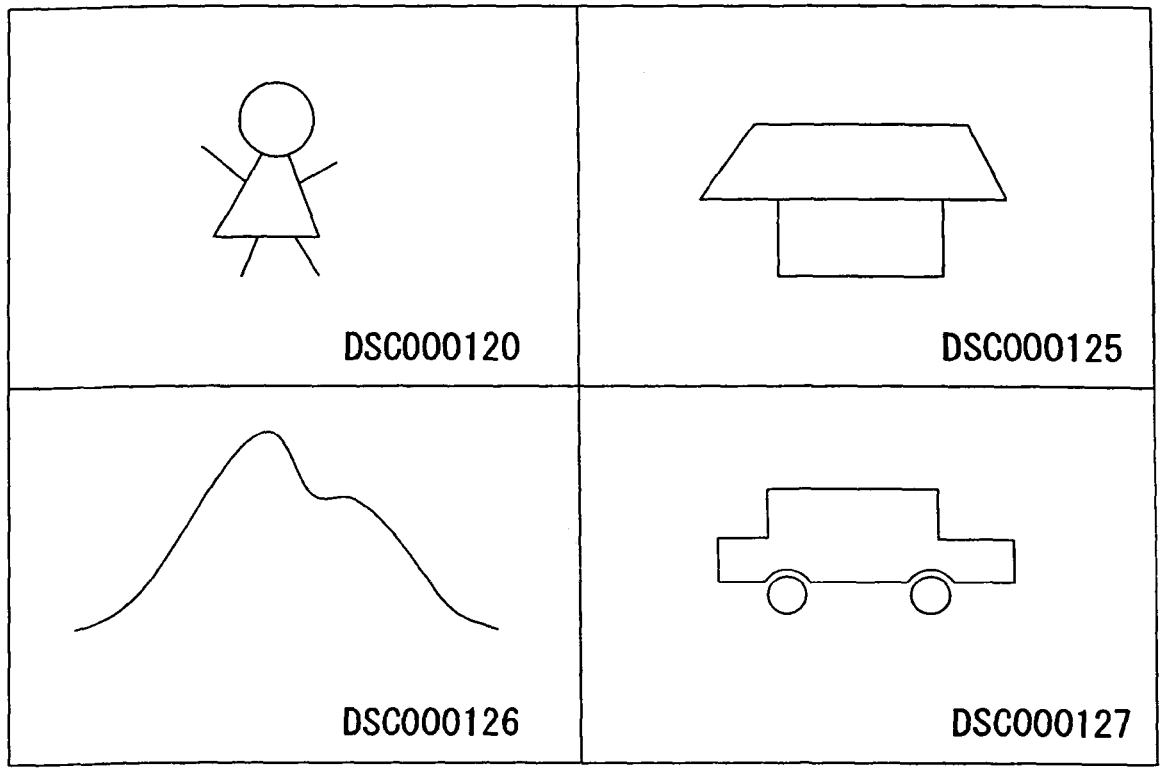
FIG. 9 is a drawing showing an example of image reproduction on the display.

The connection of a processed image data to a selected image is explained with reference to FIG. 9. FIG. 9 is an example of a reproduced image on the LCD display 107. Here, the image contents and the image file name are displayed at a time with the size of a quarter of the frame. From this frame, when an image is selected by the operating section 106, processing corresponding to the applet programs selected in advance in step S401 shown in FIG. 8 is carried out to the image data processed for ordinary recording stored in the image data memory. In this manner, the image and the image file name displayed on the LCD display 107 are connected to the processed image by the controller 310. It is needless to say that the displayed image and the image file name are also connected to the pre-processing image stored in the image data memory. When the processed images corresponding to a plurality of peripherals are there, connection of processed images should be carried out. Accordingly, for example, when a printer and an outside monitor are connected to the digital camera at the same time and an image or an image file name displayed on the outside monitor is selected, a print on the basis of the processed image data controlled in connection with the printer can be output from the printer.

Figure 11:
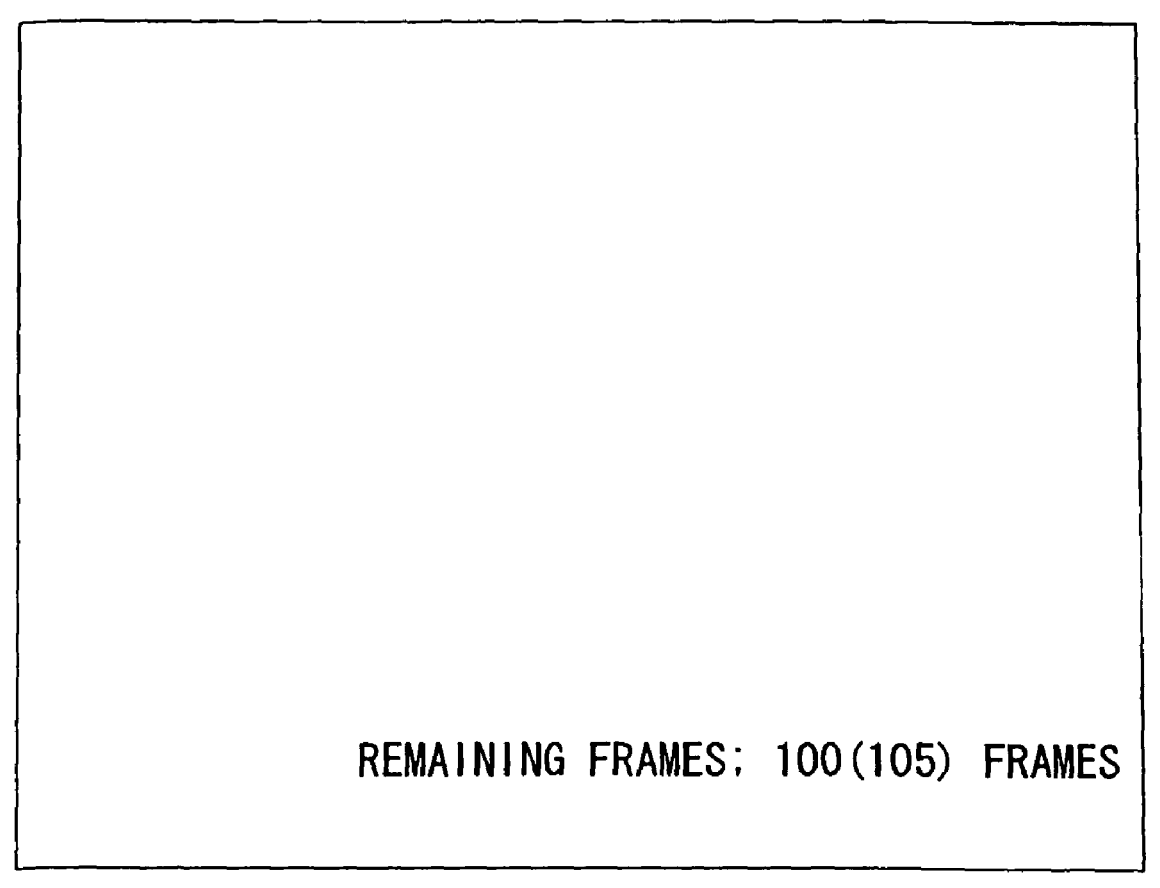

FIG. 10 is a flowchart showing the case that a peripheral is connected to the digital camera 83 after a plurality of image data processed on the basis of the procedure shown in FIG. 8 have been stored in the buffer memory 103 or the image data memory 304 of the memory card. The flow starts when the power of the digital camera is switched on. In step S501, the number of remaining frames in the memory card is displayed on the LCD display 107. FIG. 11 shows an example of a display of the number of remaining frames. In FIG. 11, the figure "100 frames" denotes the number of frames capable of being stored excluding an area stored applet programs or processed image data in the memory card. The figure "105 frames" in the parenthesis denotes the number of frames capable of being stored if all processed image data or applet programs currently stored in the data memory area are deleted.

In step S502, the kind of the connected peripheral is discriminated by the peripheral discriminator 305. In step S503, a given applet program is selected by the applet selector 302 on the basis of the discriminated result of the peripheral discriminator 305 and displayed on the LCD display 107.

Figure 14:
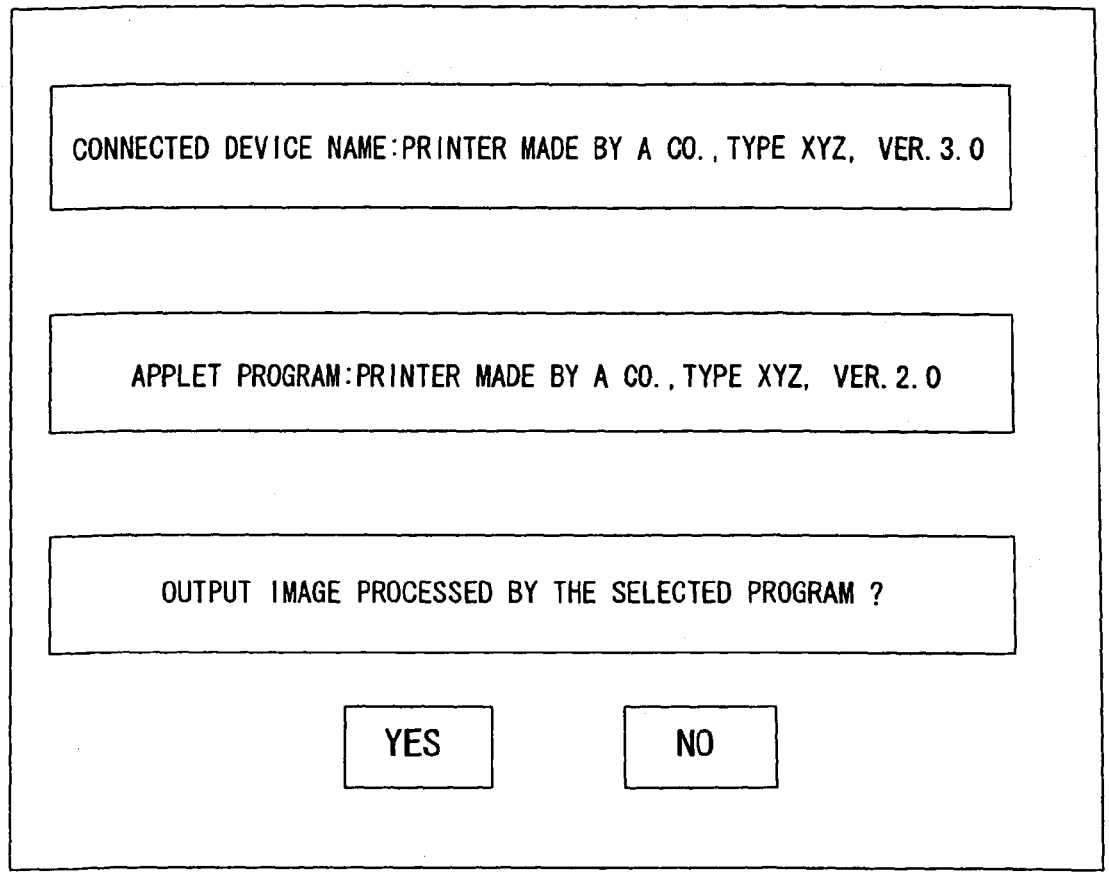
FIG. 14 shows an example of a display upon discriminating the connected peripheral.

An example of the display is shown in FIG. 14. The example shown in FIG. 14 indicates that the peripheral discriminator 305 discriminates that the peripheral connected to the digital camera 83 is a printer that is produced by A Co., has a model name of XYZ, and has an applet program of Ver. 3.0 stored in the printer. On the other hand, it also indicates that the applet selector 302 selects from the applet memory 301 an applet program, which is the closest one to the discriminated peripheral, that is for a printer produced by A Co. and having a model name of XYZ, and has the program version of Ver. 2.0. In this case, the printer maker and the model name are the same, but an old-version program is stored. In this case, it is effective to call attention by the alarm 308 such as a buzzer.

In step S504, a user checks whether the selection is correct or not. When the user judges that the difference in the version does not matter, and selects "YES", the flow proceeds to step S505. In step S505, a processed image is selected, and, in step S506, the image is output from the interface 109. When a processed image does not exist, a processed image is formed by the procedure shown in FIG. 8.

In step S504, when the user selects "NO", the flow proceeds to step S507. In step S507, a display for selecting another processing applet is shown. A display example shown in FIG. 15 shows three alternatives. The first is a method that newly reads out an applet program from the connected peripheral. The second is a method that carries out processing by a given applet program stored in the digital camera 83 in advance. The third is a method that carries out processing by another applet program selected from currently storing applet programs in the digital camera 83. One method is suitably selected and carried out, and the flow returns to step S 504.

Figure 12:
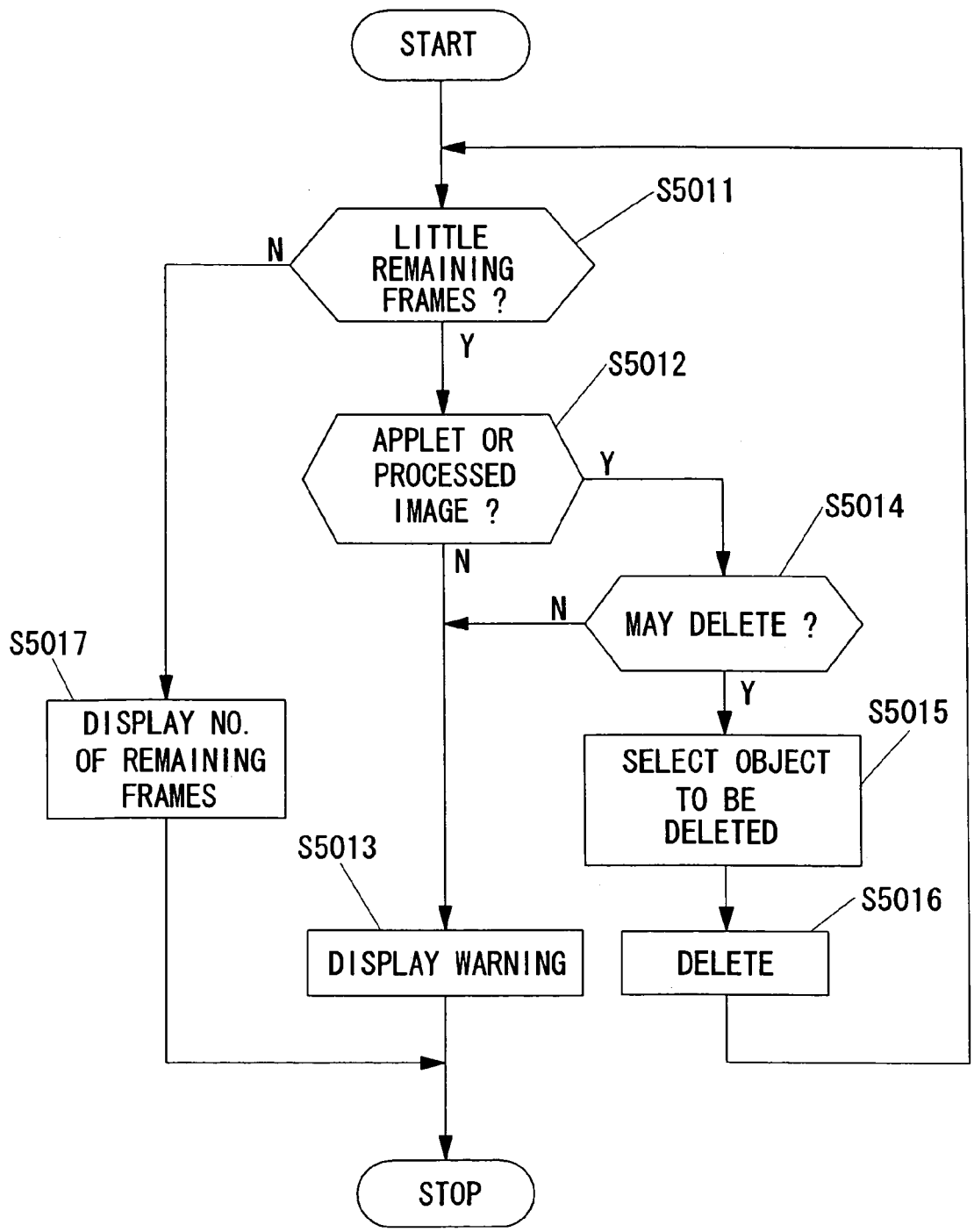
FIG. 12 is a flowchart showing movements of the digital camera shown in FIG. 7.

The method to display the number of remaining frames shown in step S501 is explained in detail with reference to FIGS. 12 and 13. In step S5011 shown in FIG. 12, when the number of remaining frames decreases to become a given number, for example, 10 frames, the flow proceeds to step S5012. In step S5012, whether applet programs or processed images are stored in the memory card or not is displayed on the LCD display 107. When no applet program or processed image is stored, only ordinary images are stored, so that the flow proceeds to step S5013. In step S5013, a warning (not shown) that "only a few remaining frames" is shown on the LCD display 107 and the flow terminates.

On the other hand, when an applet program or a processed image is stored, the flow proceeds to step S5014. In step S5014, whether the applet program or the processed image may be deleted or not is displayed on the LCD display 107 as shown in FIG. 13. When the decision is not to delete, the flow proceeds to step S5013. In step S5013, a warning is shown as the same as before and the flow terminates. When a data to be deleted is there, the flow proceeds to step S5015. In step S5015, "delete data" is selected by using the operating section 106. A display example shown in FIG. 13 shows that four kinds of applet programs are currently stored in the applet memory 301, and processed images processed with two kinds of the applet programs out of these four kinds of applet programs are stored in the image data memory. In this display shown in FIG. 13, three kinds of applet programs are checked for deleting.

After that, when "YES" is selected, the flow proceeds to step S5016. In step S5016, the selected data is deleted, and the flow returns to step S5011. In step S5011, when the number of remaining frames is sufficient, the flow proceeds to step S5017. In step S5017, the display shown in FIG. 11 is displayed. By the way, in FIG. 13, although it is shown that an applet program and a processed image data are deleted in a body, an applet program and a processed image data may be selected separately. Moreover, the processed image data may be selected frame by frame.

The method to output processed image data by a user using a suitable way on the basis of the displayed result on the LCD display 107 has been explained up to here. On the basis of the display, it is possible to set that the same procedure to select by the user is automatically carried out by the comparator

307. The procedure after selecting the applet program is the same as the method that a user judges with the help of the display as described above, so that the duplicated explanation is abbreviated. In this case, when the compared result is not identical with each other, a procedure by using the operating section 106 should be prepared in advance.

Example 3

Figure 16:
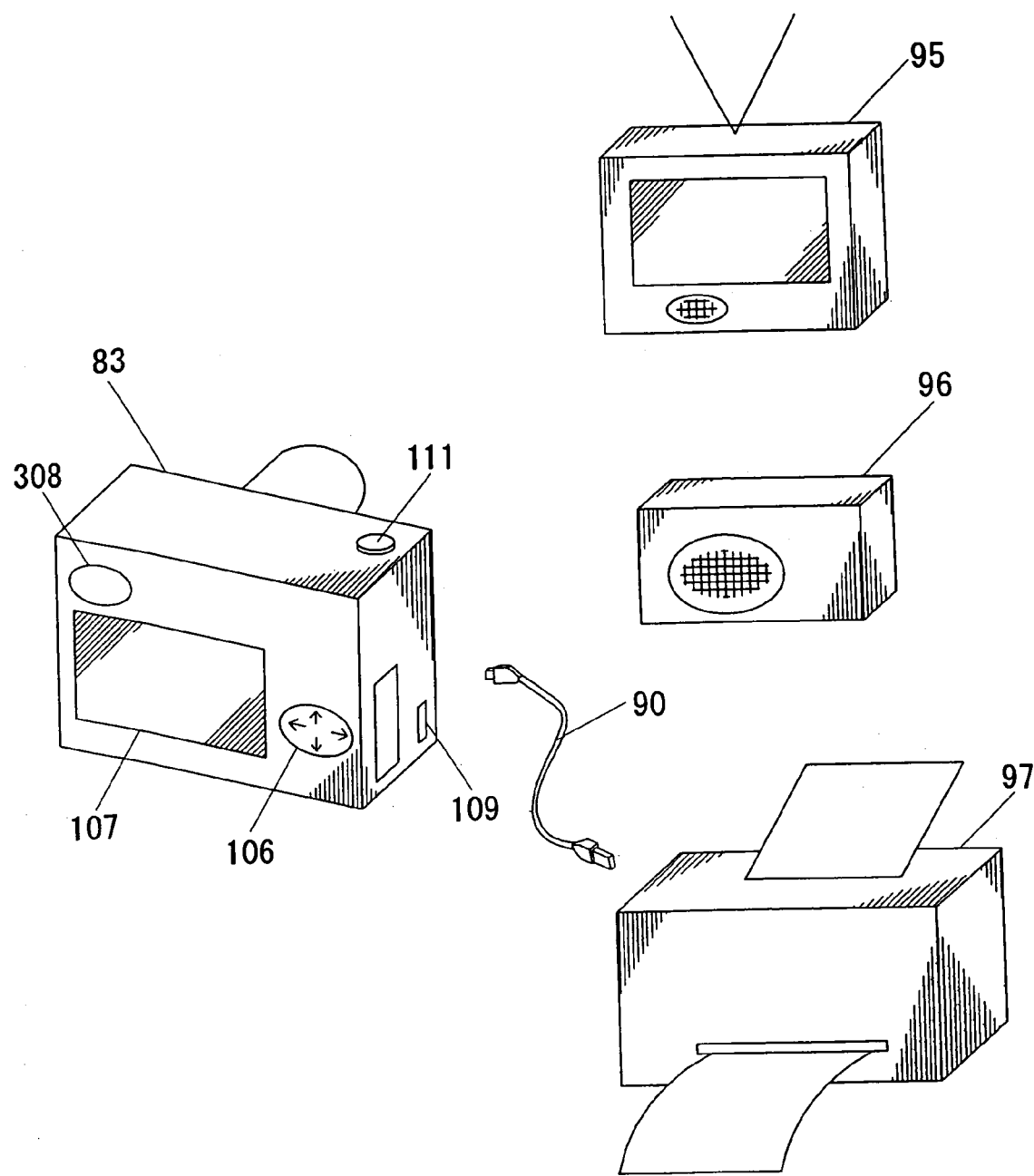
FIG. 16 is a drawing showing a digital camera system connecting peripherals according to Example 3 of the present invention.

FIG. 16 is a drawing showing a digital camera system connecting peripherals according to Example 3 of the present invention. In FIG. 16, the digital camera 83 is the same as that shown in the block diagram in FIG. 7, except the image data memory 304 stores a sound data as well as an image data.

In FIG. 16, the digital camera 83 is composed of a LCD display 107, a buzzer 308 as an alarm, a shutter release button 111, an operating section 106 for carrying out various selections, and an interface 109. From the interface 109, the digital camera is connected to a TV monitor 95 for reproducing a sound and an image data, an audio reproducer 96, and a printer 97 through a cable 90.

Figure 17:
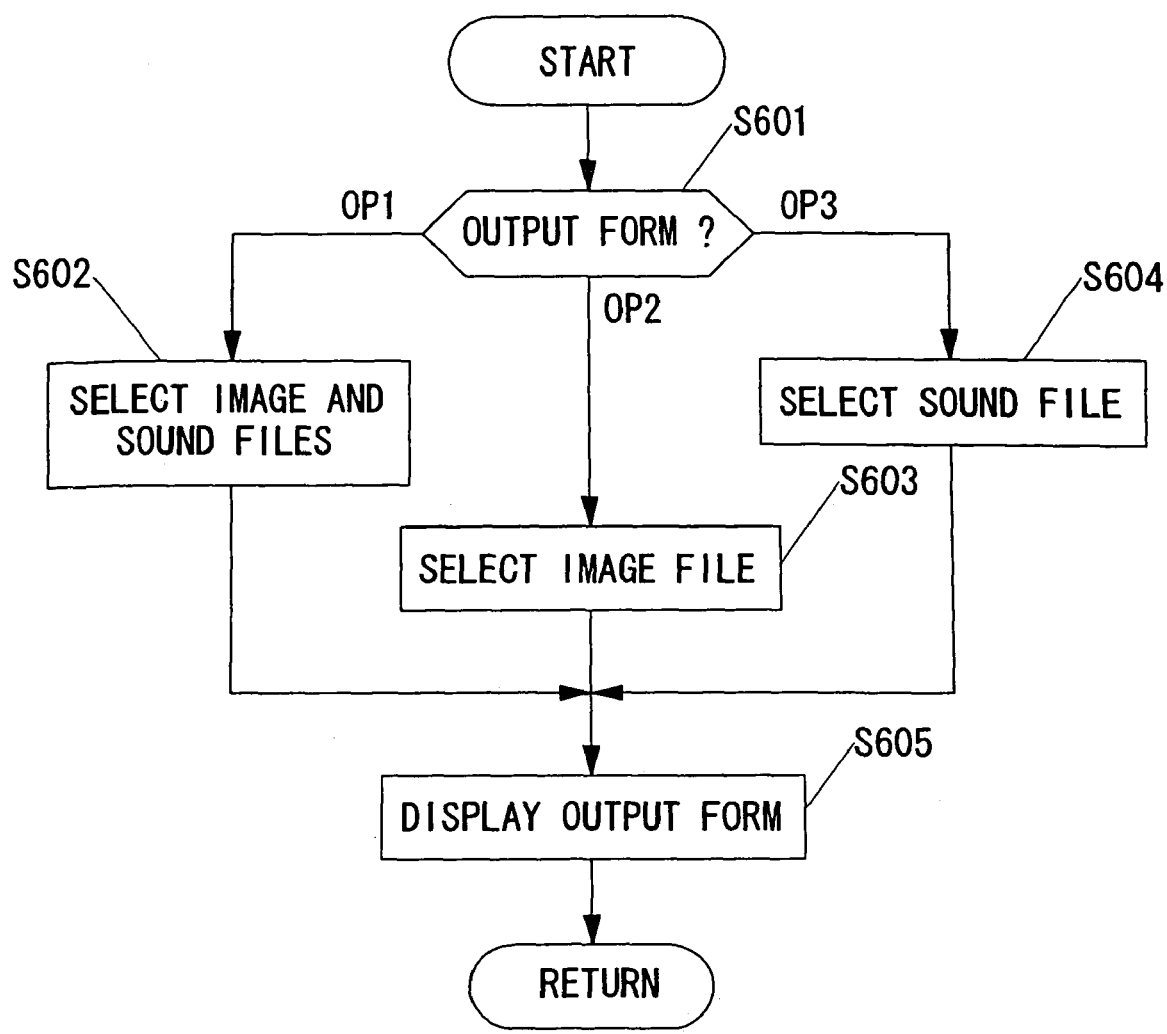
FIG. 17 is a flowchart showing movements of the digital camera shown in FIG. 16.

Here, the connecting method may be a wired/wireless method as described before. The movement of Example 3 is explained with reference to the flowchart shown in FIG. 17. The flow starts by connecting a peripheral to the digital camera 83. In step S601, the peripheral is discriminated by the peripheral discriminator 305, and on the basis of the information the CPU 108 selects the output way among three choices. A first output (OP1) is a case that an image file and a sound file are both selected as shown in step S602, which corresponds to the case that the TV monitor 95 is connected. A second output (OP2) is a case that an image file is selected as shown in step S603, which corresponds to the case that the printer 97 is connected. A third output (OP3) is a case that a sound file is selected as shown in step S604, which corresponds to an audio reproducer 96 such as a radio is connected.

Figure 18:
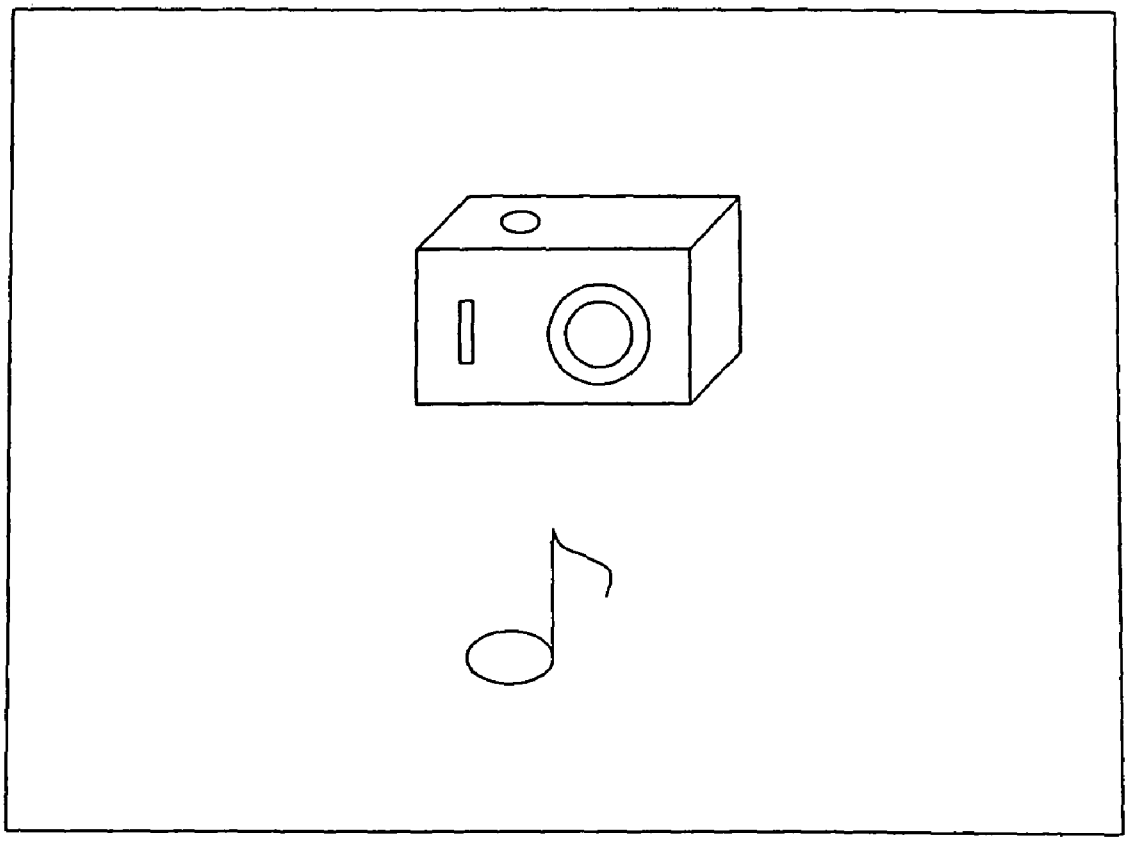
FIG. 18 shows an example of a display upon operating the digital camera shown in FIG. 16.

In step S605, after the selection the data output way is displayed on the LCD display 107 until the output has been completed as shown in FIG. 18. FIG. 18 shows the case that an image file and a sound file are both selected or being output. In order to reduce battery drain, the LCD display 107 may be off after a given time period. In this Example 3, the output data output to a peripheral has been processed on the basis of the applet program similar to the case described before.

As described above, in the present invention, a character used in application software such as game software can be changed according to a user's taste, so that the user can always enjoy games with a refreshing surprise.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image information processing system, comprising:
 a special information storage section that stores a plurality of special information related to an application program corresponding to a peripheral, the plurality of special information being for processing image data so as to have characteristics that are appropriate for output by the peripheral;
 a data input/output section that inputs and outputs data with respect to the peripheral;
 a discrimination section that identifies a type of the peripheral and that discriminates a special information stored in the peripheral based on the data input from the data input/output section in response to a connection of the peripheral;
 a special information selecting section that selects predetermined special information from among the plurality of special information stored in the special information storage section based on the type of the peripheral identified by the discrimination section;
 a comparator that compares whether the special information stored in the peripheral discriminated by the discrimination section matches the predetermined special information selected by the special information selecting section;
 an executing section that performs processing on the image data based on the comparison result of the comparator; and
 an image data output section that outputs to the peripheral the image data, to which processing has been performed by the executing section.

2. The image information processing system according to claim 1, wherein the image information processing system includes any one of a cellular phone, a personal computer, a game machine and a videophone.

3. The image information processing system according to claim 1, wherein the application program is a game program used in the image information processing system.

4. The image information processing system according to claim 3, wherein the image data is a game character.

5. The image information processing system according to claim 1, wherein the application program is a waiting frame used in a cellular phone.

* * * * *